No. 1,394. REISSUED FEB. 3, 1863.

L. MOORE.

GRAIN DRILL.

2 SHEETS—SHEET 1.

BEST AVAILABLE COPY

No. 1,394. REISSUED FEB. 3, 1863.

L. MOORE.

GRAIN DRILL.

2 SHEETS—SHEET 2.

Witnesses.
Jam's H. Lindley.
Charles Smith.

Inventor.
Lewis Moore.
Per Munn & Co
Attorneys

UNITED STATES PATENT OFFICE.

LEWIS MOORE, OF YPSILANTI, MICHIGAN, (FORMERLY OF BART, PA.)

IMPROVEMENT IN GRAIN-DRILLS.

Specification forming part of Letters Patent No. 5,552, dated April 18, 1848; Reissue No. 1,394, dated February 3, 1863.

DIVISION B.

*To all whom it may concern:*

Be it known that I, LEWIS MOORE, formerly of Bart, Pennsylvania, now of Ypsilanti, in the county of Washtenaw and State of Michigan, have invented a new and useful Improvement in Grain Drills; and I do hereby declare the following to be a full and exact description of the same, reference being had to the accompanying drawings, making part of this specification, in which—

Figure 1:
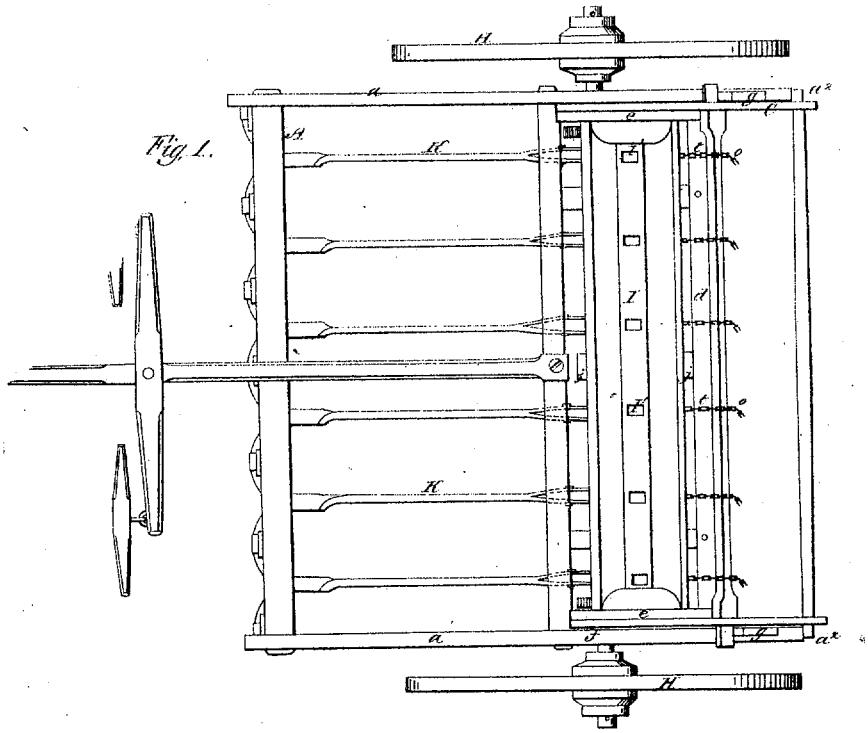
Figure 2:
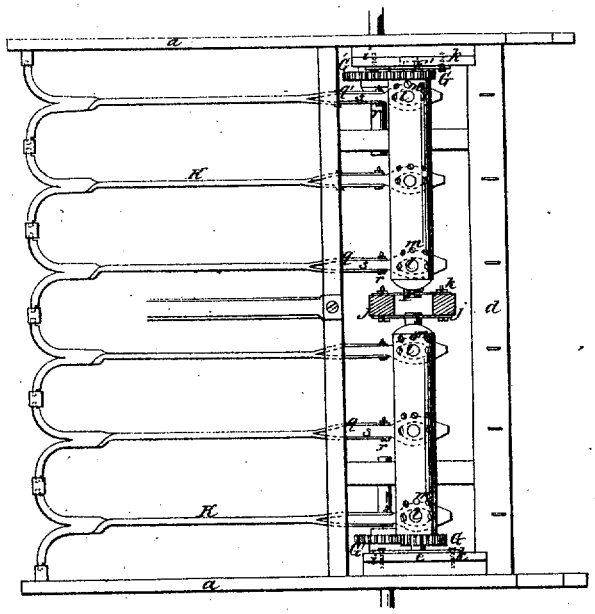
Figure 3:
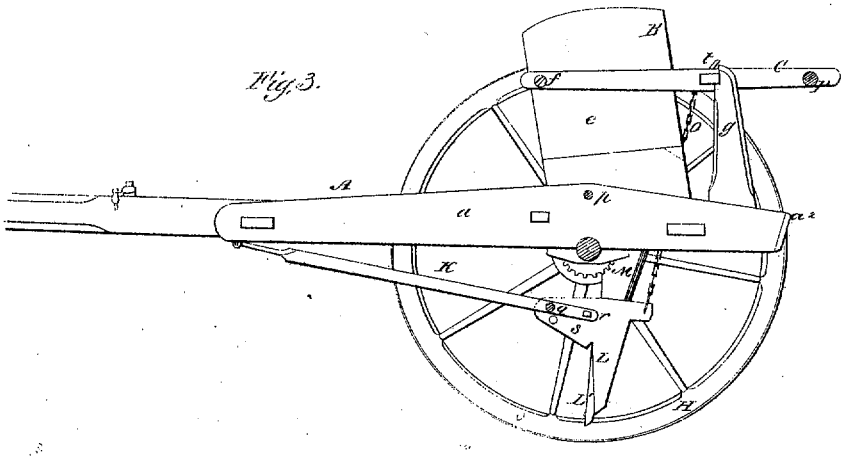
Figure 4:
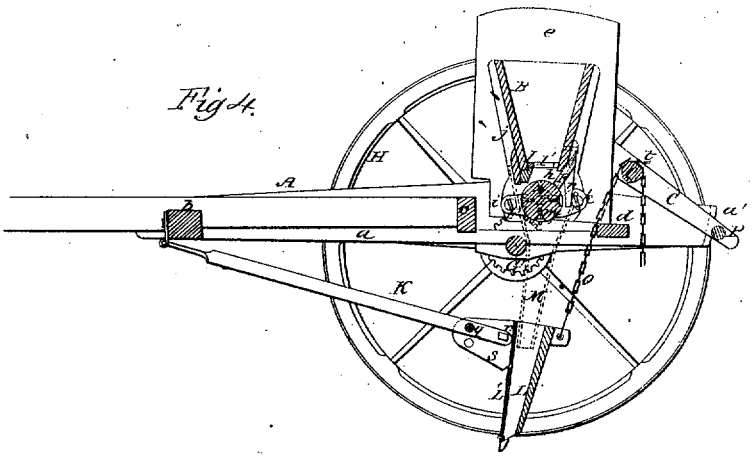

Figure 1 is a top view of a grain-drill illustrating my invention. Fig. 2 is a top view of the same with the hopper and some other parts removed. Fig. 3 is a side elevation of the machine. Fig. 4 is a transverse section of the same.

Similar letters of reference indicate corresponding parts in the several views.

My said invention relates to certain improvements in constructing and mounting drill-tubes; and it consists, first, in a provision for bracing a pivoted drill-tooth to its drag-bar without the necessity of a separate brace connected with the lower part of the tooth; second, in the use of a wooden pin, in combination with one or more flanges upon the upper part of the hoe for the purpose of releasing the said hoe in the event of it striking an immovable obstacle; third, in an improved manner of applying a nosing to the front of a drill-tooth.

To enable others skilled in the art to which my invention appertains to fully understand and use the same, I will proceed to describe its construction and operation.

The frame A, hopper B, wheels H, seeding mechanism D E F G G′ I, and conducting-tubes M may be constructed and arranged in any suitable manner, and require no specific description here.

K K K are a series of iron drag-bars, which in the present illustration are bifurcated at both ends, the forward ends being curved outward, and journaled in bearings secured to the cross-beam *b* of the main frame, and the rear ends clasping flanges *s*, projecting from the upper part of the hollow drill-teeth L.

*r r* are bolts by which the teeth are pivoted to the drag-bars.

*q q* are wooden pins, which may pass through either the drag-bar or the flanges of the drill-teeth, or both, in any suitable way by which they will operate to brace the drill-teeth in position. By means of a series of holes in either the drag-bar or flange the drill-tooth may be held at any desired angle. In the event of the tooth striking an immovable obstruction the wooden pin will break and permit the tooth to fall back without any serious injury to the machine.

L′ is a nosing or cutter of wrought iron or steel, secured to the front of each tubular drill-tooth by means of a dovetail hook or notch at top and a rivet or screw lower down, or by other equivalent device. The said nosing may be readily renewed when worn, and is employed to open the furrow and to take the wear which would otherwise come upon the drill-tooth itself. L is a nosing or cutter of wrought-iron.

P is a round or bar attached to the ends of the levers C and extending from one to the other, by which bar the operator raises or lowers said levers, and thus moves the hopper forward, throws the cog-wheel out of gear, and raises the tubular drills L out of the ground simultaneously. The ends of this round or bar P project beyond the outer sides of the said levers C, in order that its ends may rest against the back ends of the drill-frame A at $a^2$ to hold it from going out of gear when in operation. The ends of the side timbers, *a*, are inclined downward and inward for the purpose of holding the hopper to its place, as represented in Fig. 4.

I do not desire to be understood as restricting myself to the precise construction and arrangement of parts herein laid down, but propose to vary the same in any way which may be found desirable without departing from the essential principles of the invention. It is manifestly immaterial to the principle of the invention whether a fork upon the drag-bar embraces a flange projecting from the front or rear of the drill-tooth, or a double flange upon the drill-tooth embraces the single end of the drag-bar.

Having thus described my invention and a manner of using the same, the following is what I claim as new and desire to secure by Letters Patent:

1. A drill-tooth provided with one or more flanges near its upper end, by means of which it is both pivoted and braced to the drag-bar in such a manner as to dispense with the use of a separate brace-bar or its equivalent.

2. Bracing a pivoted drill-tooth to its drag-bar by means of a wooden pin held within or against a flange or projection upon the tooth, and adapted to break in the event of the said tooth striking an immovable obstacle.

3. Attaching the curved plate or nosing f to the front of the drill-tooth by means of a dovetail overlapping the top of the said nosing and a screw or rivet lower down.

LEWIS MOORE.

Witnesses:
F. T. BOGARDUS,
S. H. BOGARDUS.